Sept. 25, 1923.
W. KOCHMANN
1,468,708
PROCESS FOR PERFORMING CHEMICAL REACTIONS
Filed Oct. 8, 1914
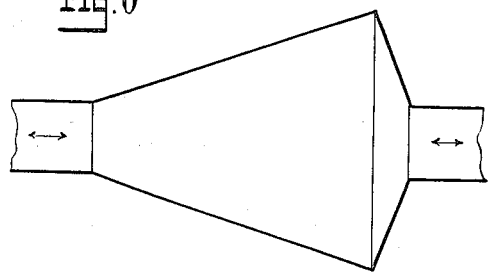
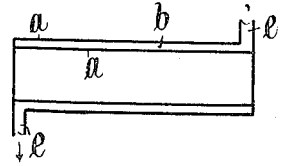
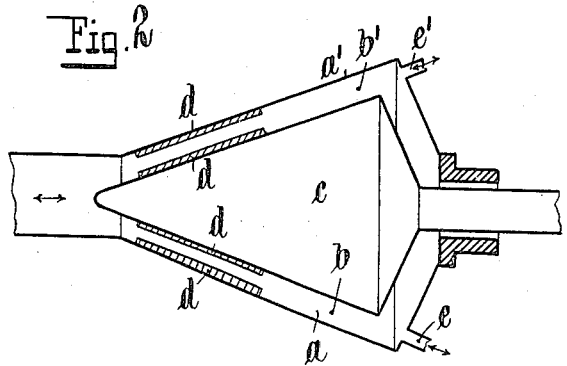
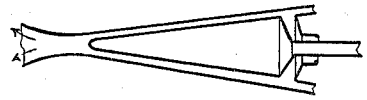
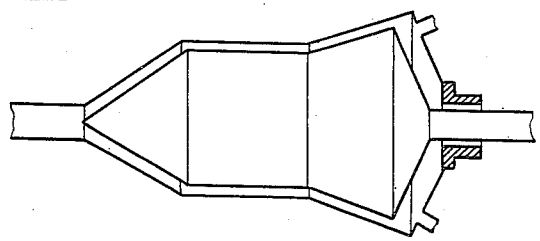
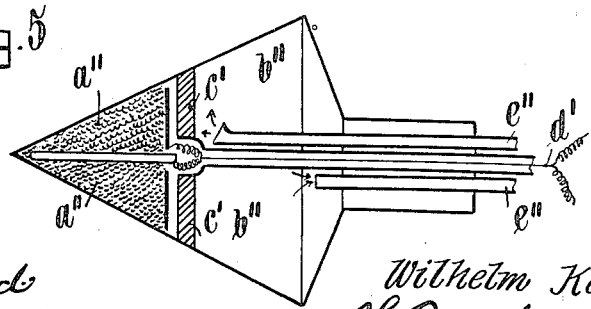

Patented Sept. 25, 1923.

1,468,708

UNITED STATES PATENT OFFICE.

WILHELM KOCHMANN, OF CHARLOTTENBURG, NEAR BERLIN, GERMANY.

PROCESS FOR PERFORMING CHEMICAL REACTIONS.

Application filed October 8, 1914. Serial No. 865,718.

*To all whom it may concern:*

Be it known that I, WILHELM KOCHMANN, citizen of Germany, residing at Charlottenburg, near Berlin, Germany, have invented new and useful Improvements in a Process for Performing Chemical Reactions, of which the following is a specification.

The course of chemical reactions is determined in such manner by the conditions of pressure, temperature and concentration that the mutual relation of these factors involves a theoretically exactly predetermined time in connection with a reaction. If this time is not exactly maintained the reaction is either incomplete or it goes beyond the desired extent or decomposition processes are set up. The maintenance of the theoretical reaction conditions for catalytic processes is particularly important.

Former systems of bringing about reactions are not adapted for securing the maintenance of the theoretical reaction conditions because the reactions, at least in the case of industrial processes on a large scale, take place in vessels or in the case of continuous processes in tubes of large section. Even when these reaction chambers were filled, when possible, with porous or fibrous carriers of catalytic agents the time of contact of the reaction mass with the catalytically acting surface of the wall was quite indefinite in consequence of its being impossible to determine the magnitude of the surface of these porous masses. Consequently each particle of the reaction mass could not remain an exactly predetermined time in the reaction chamber or in contact with the catalytic agent. Another serious disadvantage of reactions taking place in chambers of large section, thus with a thick layer of the reaction mixture, is that all parts of the reaction mixture do not undergo with certainty at the same time the same degree of conversion. The supply or withdrawal of heat through the wall of the reaction vessel on the principle employed heretofore cannot affect all parts of the reaction mixture in the same manner, but those parts which are located nearest the wall of the reaction chamber are affected more severely than those located further within. Consequently local superheating or too severe cooling can occur in the interior of the reacting chamber and the result is a non-uniform product and diminished output. This defect cannot be entirely obviated even by stirring the reaction mixture, which operation itself causes trouble and expense, and at any rate the theoretical duration of the reaction and consequently the best conditions for the course of the same are not obtained but an average duration which is always longer than the theoretical time. Apart from other defects the productivity of the entire plant is however thereby diminished.

A primary object of my invention is to perform reactions in such manner that the conditions of the actual course of the reaction fully corresponds to the theoretical requirements. This end is attained by performing the reactions continuously and whilst flowing through a reaction chamber of small cross-section. In principle it is not important what form this reaction chamber has and in what direction the reaction mixture flows through it, i. e. whether axially or tangentially, centrifugally or centripetally. In general, however, the most practical arrangement is to shape the reaction chamber as a jacketed cylinder or cone.

Several forms of apparatus for carrying my process into practice are represented by way of example in the accompanying drawing, wherein:

Figs. 1 to 6 are longitudinal sections showing various forms of my improved apparatus.

Fig. 1 shows the simplest form of such a reaction chamber having the form of a cylindrical jacket to and from which the reaction mixture is supplied and conducted away tangentially. $a$ designates the wall of the reaction chamber, $b$ the reaction chamber proper in the form of a thin layer and $e$ the supply and delivery branches for the reaction mixture.

When a reaction occurs in a thin layer each particle of this thin layer is exposed uniformly to the supply or withdrawal of heat and consequently no local superheating or excessive cooling can take place. The reaction proceeds equally far at all corresponding points of the reaction chamber and the success of a reaction in this system in no way depends on its being carried out on a small or large scale, because in the thin layer there can be always only the same quantity of reaction mixture spread over each square centimeter of the surface of the wall. Consequently only a quite definite and previously determinable reaction heat can be developed by the reaction itself at each point of the system, and a violent course of the reaction and consequently local decomposition is impossible. The duration of the reaction can be exactly determined by imparting a predetermined velocity of flow to the reaction mixture.

The surfaces of the wall of the reaction vessel can be made of a catalytic material or they can be coated therewith. In this case the action of the catalytic agent on the reaction mixture flowing in a thin layer between the two walls of the reaction vessel is exceedingly intense and perfectly uniform. Consequently each particle of the reaction mixture contacts with the catalytic agent for an exactly predetermined time. The theoretical conditions of the course of the reaction can consequently be exactly maintained even on the largest practical scale, and processes which had to be discontinuous heretofore can be performed continuously because the theoretical reaction time is considerably shorter than that average time which was heretofore required for the formerly non-uniform reactions performed with stirring. For instance, the sulphonation of organic compounds such as of the benzine hydrocarbons with sulphuric acid which until now was performed intermittently, can be performed continuously in this way.

It is preferable to give the reaction chamber a variable cross-section, and Fig. 2 shows an example of such a chamber, in which the wall is covered with a catalytic agent in addition. $a'$ designates the wall of the reaction chamber, $b'$ the reaction chamber proper, $c$ the conical middle member which is arranged displaceable if desired and constitutes the inner wall of the reaction chamber; $d$ is the catalytic agent and $e$ and $e'$ are supply and delivery branches for the reaction mixture. If the reaction chamber is made conical the middle member constituting the inner wall of the reaction vessel may be arranged displaceably, whereby the thickness of the layer in or the depth of the reaction chamber proper can be varied according to any fluctuations of working. In general, very violent reactions will be caused to take place through the variable reaction chamber in the direction from the narrower to the wider cross-section. Then, during the first violent stage of the reaction there is only a small quantity of reaction mixture in the apparatus and, in addition, it travels through the reaction chamber during the first violent stage very rapidly and slower during the slower final stage in consequence of the larger cross-section of the chamber. Owing to the variability of the cross-section the conditions of pressure and friction can be regulated as desired and adapted to the theoretical requirements of each process. Likewise, the shape of the reaction chamber can be adapted to the changes in volume of the reaction mixture in the case of gas reactions during the course of the reaction.

In individual cases the cross-section of the reaction chamber can be varied even when the reaction does not take place in a thin layer, as in the apparatus shown in Fig. 3.

When the cross-section of the reaction chamber is variable it is not necessary for the changes in section to be uniform. On the other hand non-uniform changes may be made, as in the form of apparatus shown in Fig. 4. In some processes the degree of variability of the section is different from that of others. The reaction mixture may issue through an expansion nozzle, as shown in Fig. 6. The outer and inner wall of the reaction chamber can be formed wholly or partially as a heating or cooling surface. The thermic action on the reaction mixture flowing in a thin layer is of course particularly intense and, for example, the freezing and fixation of reaction equilibrium is very easy on this system. In Fig. 5, $a''$ designates that part of a middle member which is arranged for electrical heating and constitutes the inner wall of the reaction chamber, $b''$ is that part of the middle member which is arranged for being cooled by water, $c'$ is a layer of insulation between the heated and cooled parts, $d'$ is the wire for supplying current and $e''$ the piping for supplying and discharging cooling water. This middle member serves to replace the middle member C shown in Fig. 2, and when in use the said middle member shown in Fig. 5 is inserted into a re-acting chamber which corresponds in form to the re-acting chamber $b'$ shown in Fig. 2 and having the wall $a'$. When the middle member shown in Fig. 5 is inserted in a re-acting chamber corresponding to the one shown in Fig. 2, the re-acting mixture would enter through the pipe $e$ and exit through the pipe $e'$.

The arrangement in which a reaction mixture flows through a shallow conical chamber can be employed quite generally for cooling a reaction mixture, particularly in the case of gases, without reaction. This holds good particularly when it is desired to remove the substances rapidly from a dangerous reaction zone. In this case they enter at the narrow cross-section and flow at a high speed from the dangerous zone and slacken their speed and increase the cooling action as soon as they enter into that part of the chamber which has a larger diameter.

I claim:—

1. A process for performing chemical reactions within reaction mixtures and for thermally treating such mixtures which consists in performing said reactions and thermally treating said reaction mixtures while said mixtures are arranged in layers so thin that the time necessary for the reaction, throughout the layers will be negligibly small compared with the time necessary for the running off of the whole reaction, and varying the cross section of the reaction mixture in the direction of flow of said reaction mixture according to the variation of the reaction conditions during said reaction.

2. A process for performing chemical reactions within reaction mixtures and for thermally treating such mixtures which consists in performing said reactions and thermally treating said reaction mixtures while said mixtures are arranged in layers so thin that the time necessary for the reaction, throughout the layers will be negligibly small compared with the time necessary for the running off of the whole reaction, varying the cross section of the reaction mixture in the direction of flow of said reaction mixture according to the variation of the reaction conditions during said reaction, and arranging a cooling zone directly beside a heating zone, so that an immediate stoppage of the reaction will take place.

3. A process for performing chemical reactions within reaction mixtures and for thermally treating such mixtures which consists in causing the said mixtures to flow in layers so thin that the time necessary for balancing the differences of the status of reaction of all particles met by any section conducted vertically across the flowing direction is negligibly small compared with the time necessary for completing the whole reaction and that all particles met by any cross section vertical to the flowing direction have practically the same status of reaction, and varying the cross section of the reaction mixture in the direction of flow of said reaction mixture according to the variation of the reaction conditions during said reaction.

4. A process for performing chemical reactions within reaction mixtures and for thermally treating such mixtures which consists in causing the said mixtures to flow in layers so thin that the time necessary for balancing the differences of the status of reaction of all particles met by any section conducted vertically across the flowing direction is negligibly small compared with the time necessary for completing the whole reaction and that all particles met by any cross section vertical to the flowing direction have practically the same status of reaction, and varying the cross section of the reaction mixture in the direction of flow of said reaction mixture according to the variation of the reaction conditions during said reaction, and arranging a cooling zone directly beside a heating zone, so that an immediate stopping of the reaction may be attained.

In testimony whereof I have hereunto set my hand in presence of two subscribing witnesses.

Dr. WILHELM KOCHMANN.

Witnesses:
 WOLDEMAR HAUPT,
 HENRY KASPER.